(12) United States Patent
Oravecz (10) Patent No.: US 11,390,351 B1
(45) Date of Patent: Jul. 19, 2022

(54) COMPACT STREAMLINED VARIABLY ADJUSTABLE HANDLEBARS

(71) Applicant: Paul Oravecz, Los Angeles, CA (US)

(72) Inventor: Paul Oravecz, Los Angeles, CA (US)

( * ) Notice: Subject to any disclaimer, the term of this patent is extended or adjusted under 35 U.S.C. 154(b) by 0 days.

(21) Appl. No.: 17/208,430

(22) Filed: Mar. 22, 2021

(51) Int. Cl.
*B62K 21/16* (2006.01)
(52) U.S. Cl.
CPC .................................. *B62K 21/16* (2013.01)
(58) Field of Classification Search
CPC ........ B62K 21/16; B62K 21/12; B62K 11/14; B63H 2025/024
See application file for complete search history.

(56) References Cited

U.S. PATENT DOCUMENTS

| | | | | |
|---|---|---|---|---|
| 6,176,503 | B1 * | 1/2001 | George | B62K 21/02 280/277 |
| 9,038,500 | B1 | 5/2015 | Oravecz | |
| 9,272,748 | B1 | 3/2016 | Oravecz | |
| 9,708,024 | B2 | 7/2017 | Oravecz | |
| 10,173,745 | B1 | 1/2019 | Oravecz | |
| 10,351,203 | B2 | 7/2019 | Oravecz | |
| 2021/0086863 | A1 * | 3/2021 | Wang | B62K 21/18 |

FOREIGN PATENT DOCUMENTS

| | | | | |
|---|---|---|---|---|
| DE | 29916963 | U1 * | 2/2000 | B62K 21/16 |

OTHER PUBLICATIONS

Machine Translation of DE 29916963.*

* cited by examiner

*Primary Examiner* — Richard W Ridley
*Assistant Examiner* — Brian J McGovern
(74) *Attorney, Agent, or Firm* — William J. Benman; Benman, Brown & Williams (57) ABSTRACT

A powered handlebar adjustment assembly adapted for use with a vehicle having first and second forks aligned in a parallel relation along a first longitudinal axis, first and second triple tree supports aligned in a second axis transverse to the first axis, and a set of handlebars mounted parallel to the first and second triple trees and transverse to the first and second forks. The assembly includes a first and second telescopic supports, each having a first section thereof mounted between and in parallel with the first axis of the first and second forks and between and transverse to the axis of the first and second triple tree supports. A second section is mounted between the first triple tree and the handlebars at a proximal end of the second section and concentric with the first section at a distal end of the second section for translation relative thereto between the first and second forks and parallel thereto. First and second actuators are mounted between the first and second forks and between the first and second triple tree supports. Each actuator is operationally coupled to the second section of a telescopic support via the first section thereof. Actuation of the actuators via a switch mounted on the handlebars is effective to cause the second sections of the telescopic supports to translate relative to the first sections thereof and thereby move the handlebars from a first position to a second position.

26 Claims, 9 Drawing Sheets

COMPACT STREAMLINED VARIABLY ADJUSTABLE HANDLEBARS

BACKGROUND OF THE INVENTION

Field of the Invention

The present invention relates to motorcycles, bicycles, snow mobiles and other vehicles with handlebars. More specifically, the present invention relates to systems and techniques for adjusting the position of the handlebars used on such vehicles.

Description of the Related Art

It is well-known in the motorcycle community that the typically fixed position of the handlebars has numerous limitations including: 1) a suboptimal positioning of the handlebars for a rider; 2) even if optimal at one time, the fixed handlebar position can be uncomfortable for a rider on another occasion due to injury, illness, weight gain or a variety of other changes in the riders condition or mood; and/or 3) the position of the handlebars, even if comfortable at the start of a ride, can become uncomfortable over time after long hours on the road.

Accordingly, a need existed in the art for an apparatus and method for adjusting the position of handlebars for motorcycles and other similar vehicles. While adjustable handlebars are known in the art, these conventional systems typically require the user to adjust the handlebar positions mechanically and by hand. This is slow, cumbersome and typically provides a discrete set of position options as opposed to a continuous set of position options.

The need in the art was addressed by U.S. Pat. No. 9,038,500 entitled SYSTEM AND METHOD FOR CONTINUOUSLY VARIABLE MOTORIZED ADJUSTMENT OF MOTORCYCLE HANDLEBARS issued to P. Oravecz on May 26, 2015; U.S. Pat. No. 9,708,024 entitled FUNCTIONAL DUAL HANDLEBAR DESIGN WITH CONTROLS AND MOUNTING ARRANGEMENT issued to P. Oravecz on Jul. 18, 2017; U.S. Pat. No. 10,351,203 entitled FUNCTIONAL DUAL HANDLEBAR DESIGN WITH CONTROLS AND MOUNTING ARRANGEMENT issued to P. Oravecz on Jul. 16, 2019; U.S. Pat. No. 9,272,748 entitled MECHANISM FOR EFFECTING TRANSLATIONAL AND ROTATIONAL MOTION issued to P. Oravecz on Mar. 1, 2016; and U.S. Pat. No. 10,173,745 entitled MECHANISM FOR SECURING A PAYLOAD IN A DESIRED ANGULAR ORIENTATION issued to P. Oravecz on Jan. 8, 2019 the teachings of which are collectively incorporated herein by reference.

However, a need remains in the art for a more compact, streamlined, lightweight and cost effective system and method for adjusting the position of vehicle handlebars.

SUMMARY OF THE INVENTION

The need in the art is addressed by the powered handlebar adjustment assembly of the present invention adapted for use with a vehicle having first and second forks aligned in a parallel relation along a first longitudinal axis, first and second triple tree supports aligned in a second axis transverse to the first axis, and a set of handlebars mounted parallel to the first and second triple trees and transverse to the first and second forks.

In an illustrative embodiment, the powered handlebar adjustment assembly includes a first telescopic support having a first section thereof mounted between and in parallel with the first axis of the first and second forks and between and transverse to the axis of the first and second triple tree supports. A second section is mounted between the first triple tree and the handlebars at a proximal end of the second section and concentric with the first section at a distal end of the second section for translation relative thereto between the first and second forks and parallel thereto.

The assembly further includes a second telescopic support having a first section thereof mounted between and in parallel with the first axis of the first and second forks and between and transverse to the axis of the first and second triple tree supports. A second section of the second telescopic support is mounted between the first triple tree and the handlebars at a proximal end of the second section and concentric with the first section at a distal end of the second section for translation relative thereto between the first and second forks and parallel thereto.

A first actuator is mounted between the first and second forks and between the first and second triple tree supports. The first actuator is operationally coupled to the second section of the telescopic support via the first section thereof.

A second actuator is mounted between the first and second forks and between the first and second triple tree supports. The second actuator is operationally coupled to the second section of the second telescopic support via the first section thereof. Actuation of the actuators via a switch mounted on the handlebars is effective to cause the second sections of the telescopic supports to translate relative to the first sections thereof and thereby move the handlebars from a first position to a second position. In a more specific embodiment, a handlebar clamp is included for securing the first and second telescopic supports to the handlebars. First and second pressure levers secure the handlebar clamp to the handlebars whereby the handlebars are adapted to rotate about a longitudinal axis through the clamp in a first open position of the levers and restrained against rotational motion about the longitudinal axis in a second closed position thereof.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
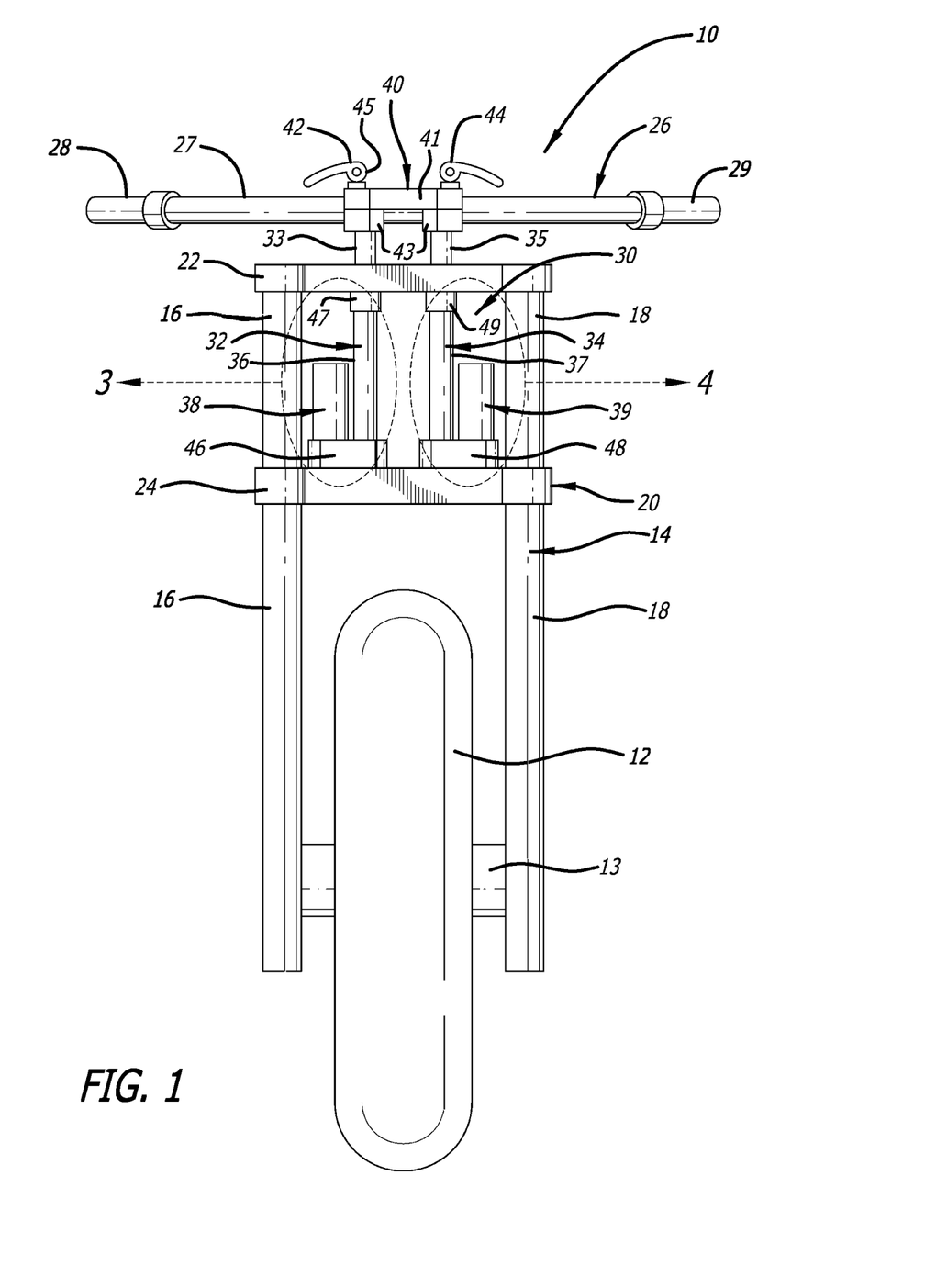
FIG. 1 is a front elevational view of an illustrative embodiment of the compact streamlined handlebar adjustment mechanism of the present invention mounted on a motorcycle in a first lowered position.

FIG. 1 is a front elevational view of an illustrative embodiment of the compact streamlined handlebar adjustment mechanism of the present invention mounted on a motorcycle in a first lowered position.

Figure 2:
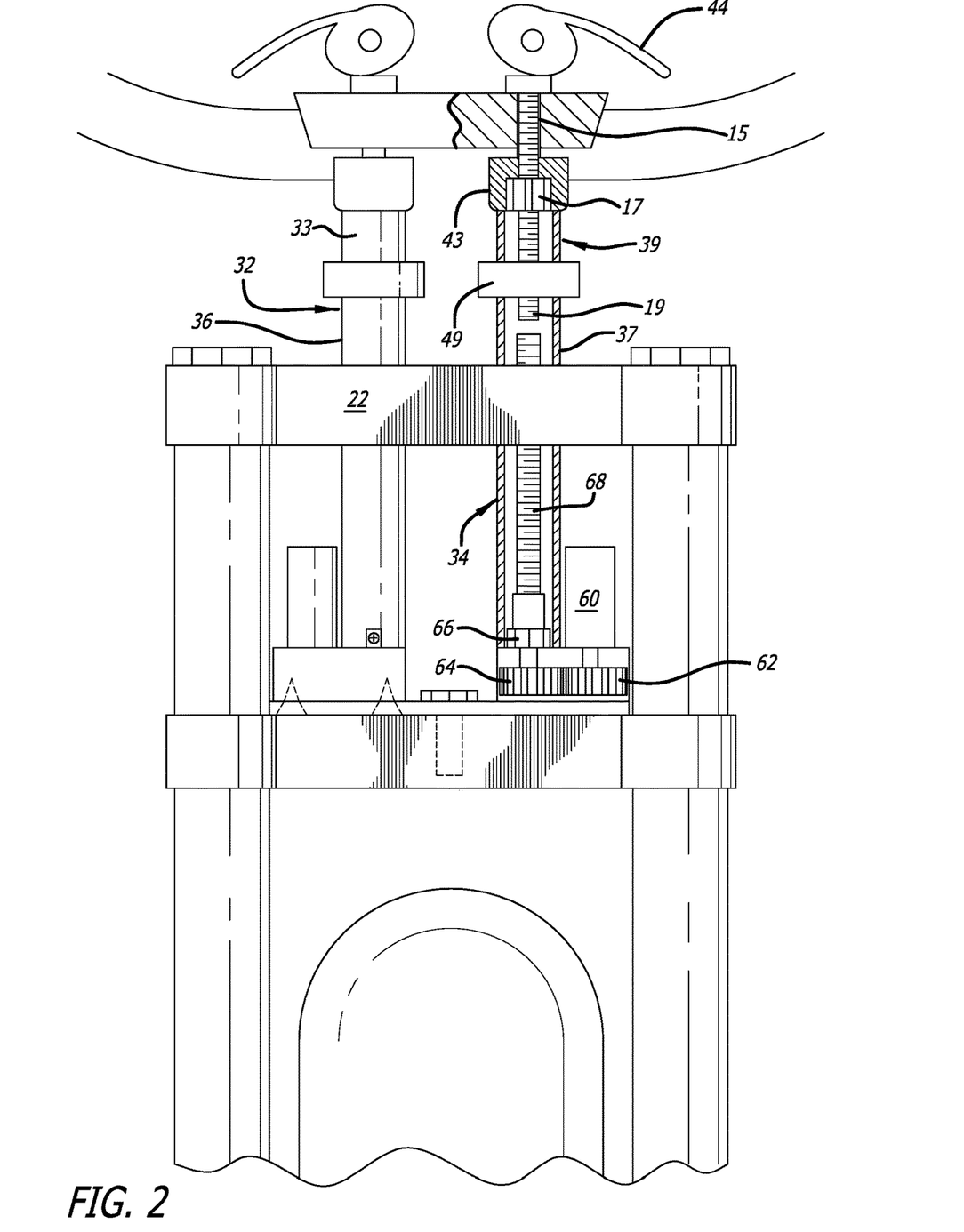
FIG. 2 is a front elevational view of the handlebar adjustment mechanism of the present invention as depicted in FIG. 1 in the second elevated position.

FIG. 2 is a front elevational view of the handlebar adjustment mechanism of the present invention as depicted in FIG. 1 in the second elevated position.

As illustrated in FIGS. 1 and 2, the motorcycle 10 has a frame 11 (not shown) coupled to a front wheel 12 via an axle 13 and a fork 14 in accordance with conventional teachings. The fork 14 has first and second tubes or stanchions 16 and 18 aligned in parallel along the longitudinal axes thereof. The fork may be telescopic with active or passive tubes. As is known in the art, a telescopic fork is one that uses fork tubes with suspension components (coil springs and dampers) internally to dampen vibration.

In accordance with conventional teachings, at the distal end thereof, the fork stanchions 16 and 18 are attached to the front wheel 12 via the axle 13 and at the proximal end, secured to the vehicle frame 11 (not shown) via a triple tree 20. The triple tree 20 has an upper yoke 22 and a lower yoke 24 mounted in parallel therewith along a longitudinal axis transverse to the longitudinal axis of the fork 14. As is well-known in the art, the triple tree 20 attaches the fork tubes 16 and 18 to the frame 11 (not shown) via steering head bearings (not shown), which allow a rider to steer the motorcycle by causing the forks to pivot from side to side. The upper and lower triple tree yokes 22 and 24 provide two solid clamping points that keep the fork tubes 16 and 18 parallel while also connecting the forks to the frame 11.

As discussed more fully below, a handlebar assembly 26 is coupled to the fork via the compact, streamlined, handlebar adjustment mechanism 30 of the present invention. The handlebar assembly 26 is generally of conventional design and construction with a conventional handlebar 27 having first and second grips 28 and 29 at the distal ends thereof.

In accordance with the present teachings, the compact, streamlined, handlebar adjustment mechanism 30 couples the handlebar assembly 26 to the fork 14 via the triple tree 20. First and second upper sections 33 and 35 of first and second parallel risers 32 and 34, respectively, of the handlebar adjustment mechanism 30 are secured to the handlebar assembly 26 via a clamp 40. The clamp 40 has a top plate 41 adapted to sit on top of the handlebar and a bottom plate 43 adapted to support the handlebar 27 from the underside thereof.

First and second pressure (aka 'quick release') levers 42 and 44 extend through the top plate 41 of the clamp 40 and engage threads 15 in the bottom plate 43 of the clamp 40. As is well-known in the art, a quick release lever is a mechanism that consists of a rod (not shown) threaded on one end with a lever operated cam assembly on the other. When rotated, the irregularly shaped cam 45 serves to force the top plate 41 of the clamp 40 toward the bottom plate 43 and thereby secure the clamp 40 to the handlebar 27. The clamp 40 and pressure levers 42 and 44 are shown more clearly in the rear perspective views of FIGS. 6 and 7.

When the levers 42 and 44 are lifted, the handlebar 27 is released and free to be manually rotated about the longitudinal axis thereof. This allows a rider to change the angle and elevation of the grips 28 and 29 at the distal end thereof as discussed more fully below with respect to FIG. 8.

As illustrated in FIG. 2, the first and second upper telescopic sections 33 and 35 of first and second risers 32 and 34, respectively, are secured into the bottom plate 43 of the clamp 40 via a bolt 17 having threads 19. First and second upper telescopic sections 33 and 35 extend through the upper yoke 22 of the triple tree 20 into first and second respective lower receiving sections 36 and 37. In FIG. 2, note that only the upper and lower sections 35 and 37 of the second riser 34 are shown in a sectional view as the upper and lower sections 33 and 36 of the first section are identical in design and construction.

Optional collars 47 and 49 may be included above or below the upper yoke 22 for additional stability and stiffness.

In the best mode, for a typical motorcycle application, the upper sections 33 and 35 should have lengths ranging from 5 to 8.5 and diameters ranging from $1^{1/4}$ to $1^{3/4}$ inches and the lower sections 35 and 37 should have lengths ranging from 5 to 7 inches and diameters ranging from $1^{3/8}$ to $1^{7/8}$ inches. These dimensions enable the upper sections 33 and 35 to translate into the lower sections 36 and 37 respectively. However, those of ordinary skill in the art will appreciated that the lengths and relative diameters of the upper and lower sections would be chosen based on the requirements of a chosen application and, as such, the present invention is not limited to the illustrative embodiment disclosed herein.

Figure 3:
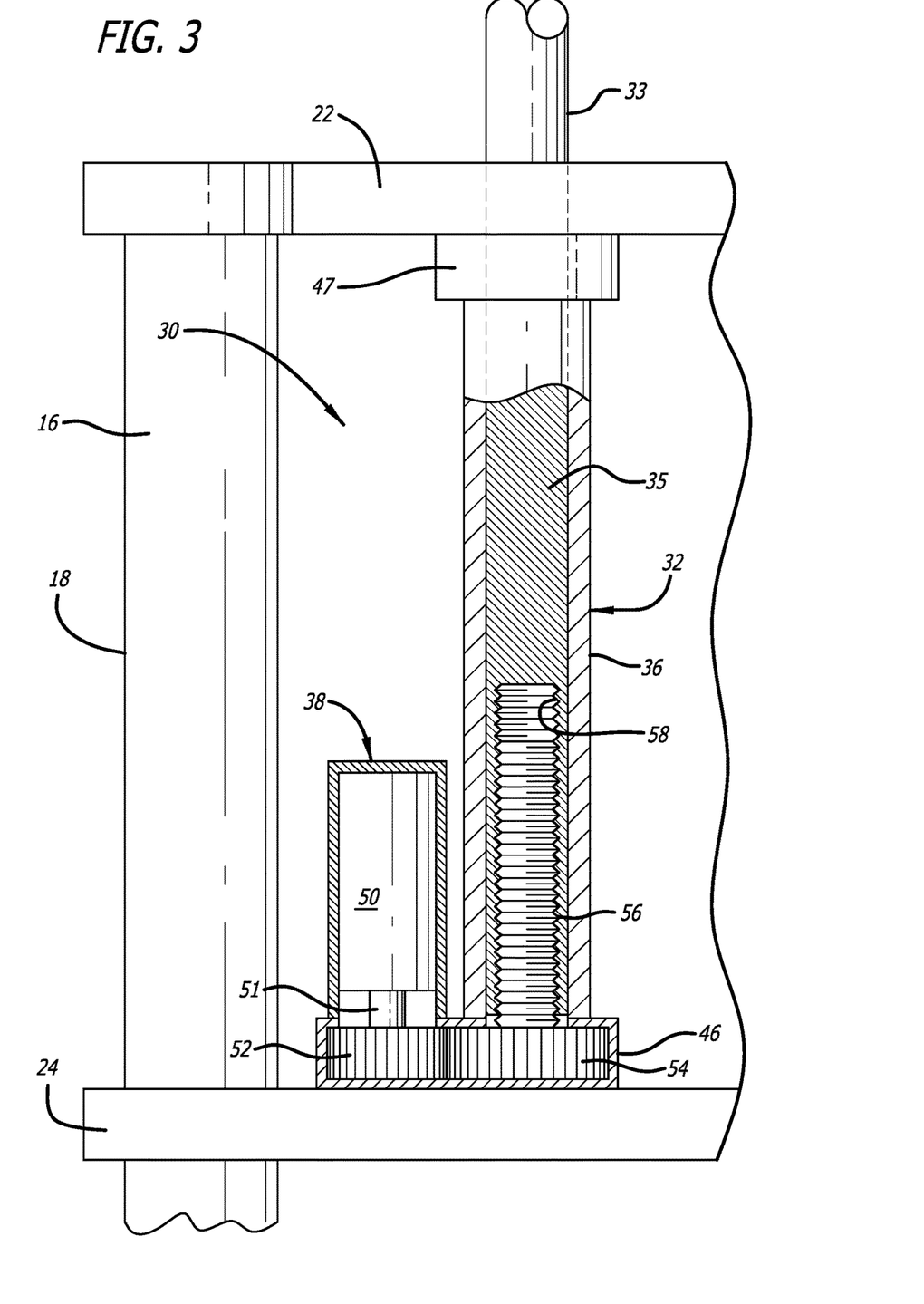
FIG. 3 is a magnified partial sectional front view of the left actuator of the illustrative embodiment of the handlebar adjustment mechanism of the present invention in the first lowered operational position thereof.

FIG. 3 is a magnified partial sectional front view of the left actuator of the illustrative embodiment of the handlebar adjustment mechanism of the present invention in the first lowered operational position thereof.

Figure 4:
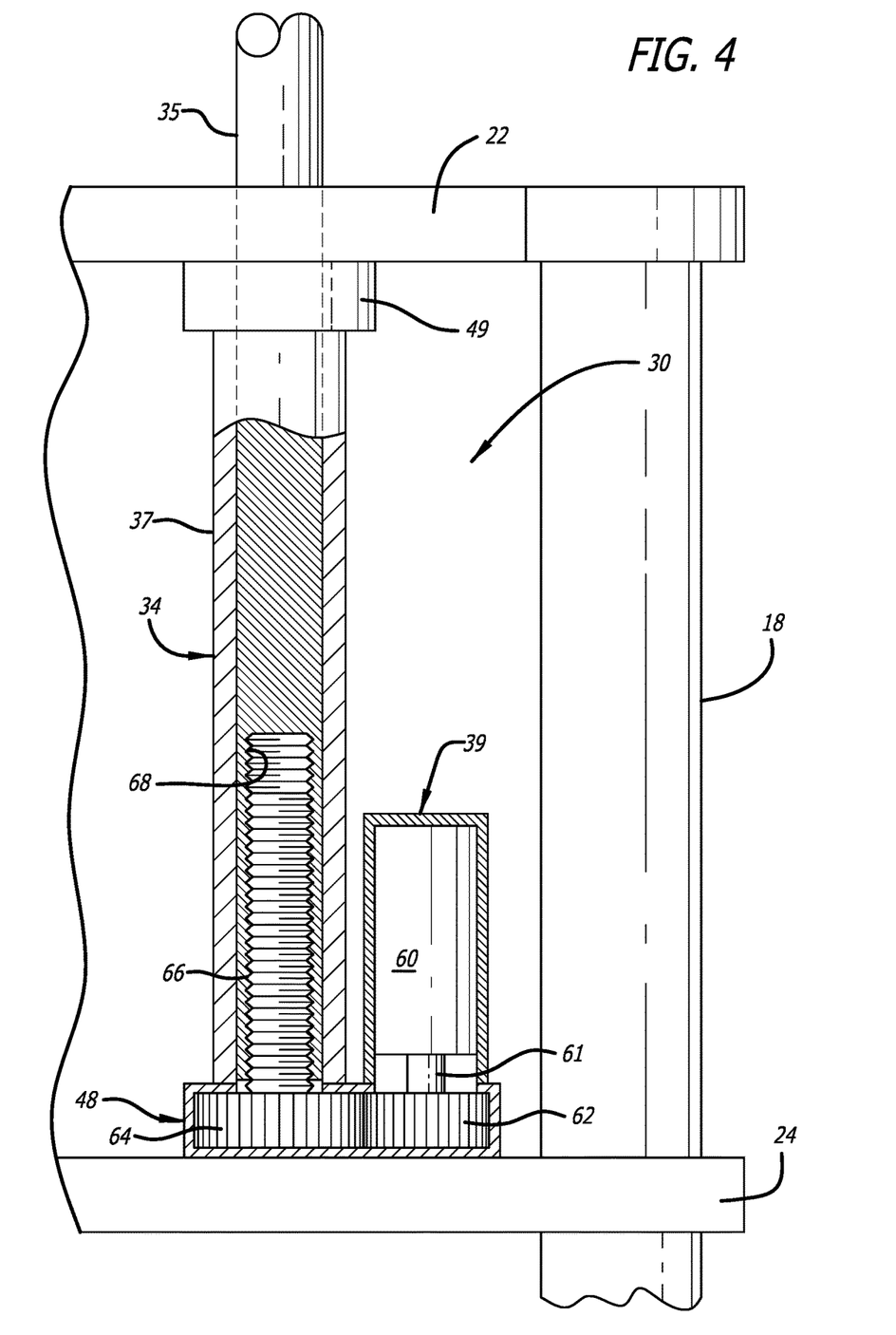
FIG. 4 is a magnified partial sectional front view of the right actuator of the illustrative embodiment of the handlebar adjustment mechanism of the present invention.

FIG. 4 is a magnified partial sectional front view of the right actuator of the illustrative embodiment of the handlebar adjustment mechanism of the present invention.

Figure 5:
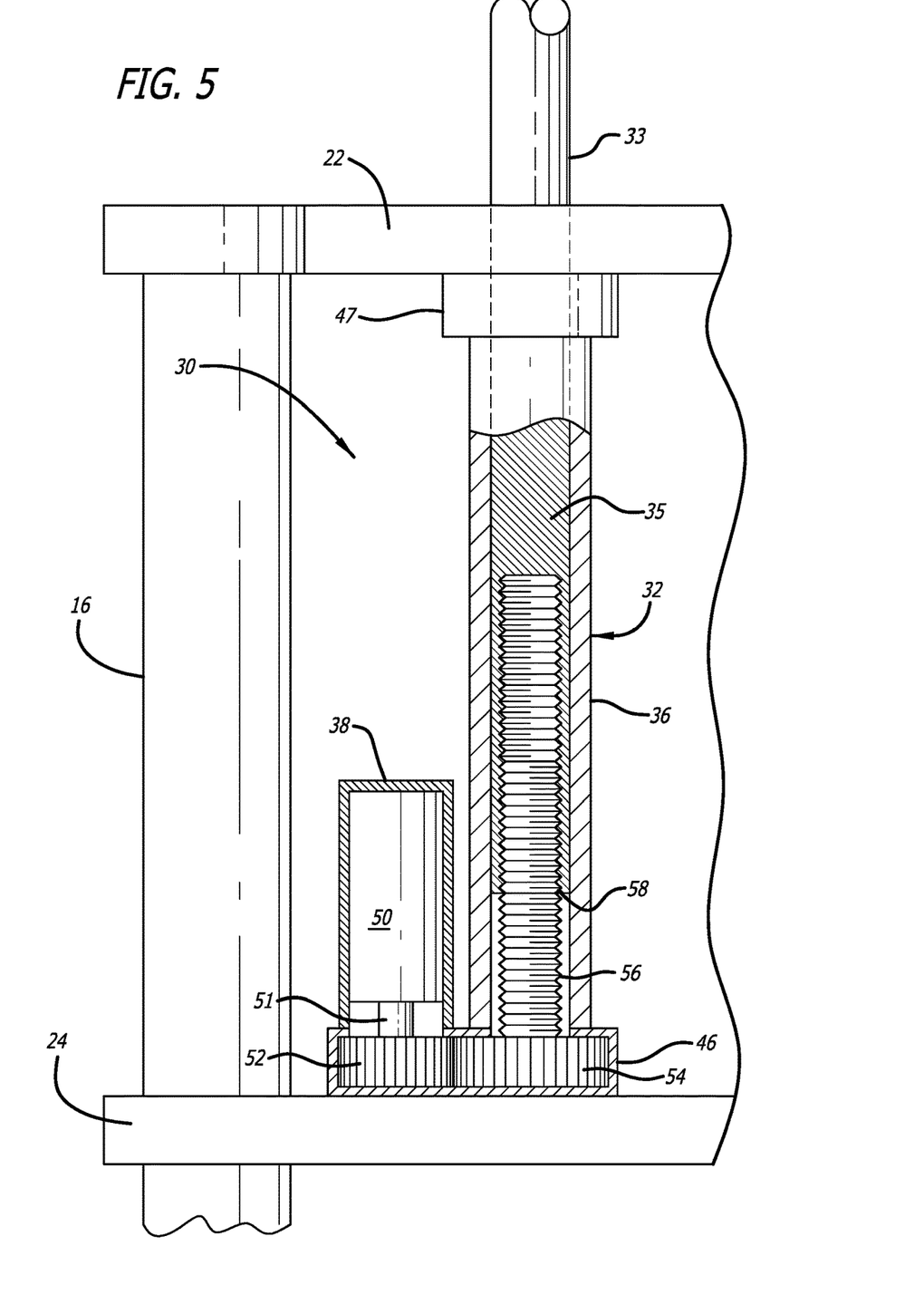
FIG. 5 is a magnified partial sectional front view of the left actuator of the illustrative embodiment of the handlebar adjustment mechanism of the present invention in a second elevated operational position thereof.

FIG. 5 is a magnified partial sectional front view of the left actuator of the illustrative embodiment of the handlebar adjustment mechanism of the present invention in a second elevated operational position thereof.

Figure 6:
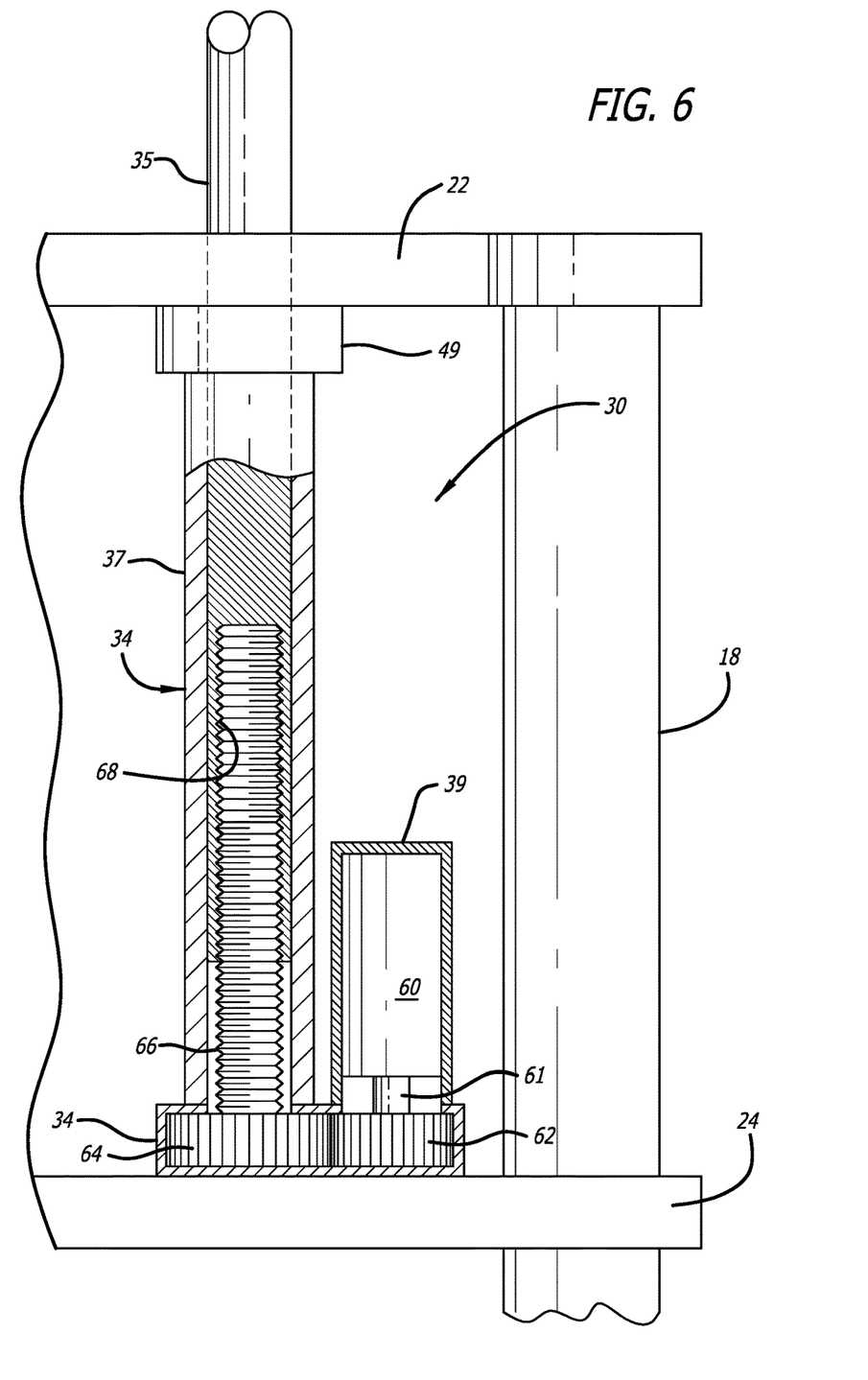
FIG. 6 is a magnified partial sectional front view of the right actuator of the illustrative embodiment of the handlebar adjustment mechanism of the present invention in a second elevated operational position thereof.

FIG. 6 is a magnified partial sectional front view of the right actuator of the illustrative embodiment of the handlebar adjustment mechanism of the present invention in a second elevated operational position thereof.

As illustrated in FIGS. 3-6, the movement of the upper telescopic sections 33 and 35 relative to the lower sections 36 and 37 is effectuated by first and second actuators 38 and 39 and first and second gear assemblies 46 and 48 respectively. In the illustrative embodiment, the actuators 38 and 39 are electric motors and the gear assemblies 46 and 48 are worm or screw drives. However, the present invention is not limited thereto. That is, the electric motors and worm drives can be replaced with pneumatic or hydraulic actuators without departing from the scope of the present teachings.

In FIG. 3, the left actuator 38 includes an electric motor 50 of which the rotor 51 thereof is coupled to a circular gear 52. The gear 52 is mounted in engagement with a mating gear 54 mounted within the first gearing assembly 46 at the base of the first riser 32. A screw 56 is secured within the gear 54 in threaded engagement with threads 58 in the upper section 33 of the riser 32.

Similarly, in FIG. 4, the right actuator 39 is shown with an electric motor 60 of which the rotor thereof 61 is coupled to a second circular gear 62. The second gear 62 is mounted in engagement with a mating gear 64 mounted within the second gearing assembly 48 at the base of the second riser 34.

Accordingly, actuation of the first motor 50 is effective to induce translation of the upper section 33 of the first riser 32 in a telescopic manner from a first position as shown in FIG. 3 to a second position as shown in FIG. 5. Likewise, actuation of the second motor 60 is effective to induce translation of the upper section 35 of the second riser 34 in a telescopic manner as shown in FIG. 6.

In the best mode, both motors are actuated in unison however, it is envisioned that for some application or requirement, it might be beneficial to enable independent operation of the motors to effectuate a tilt in the handlebars from a horizontal orientation.

Figure 7:
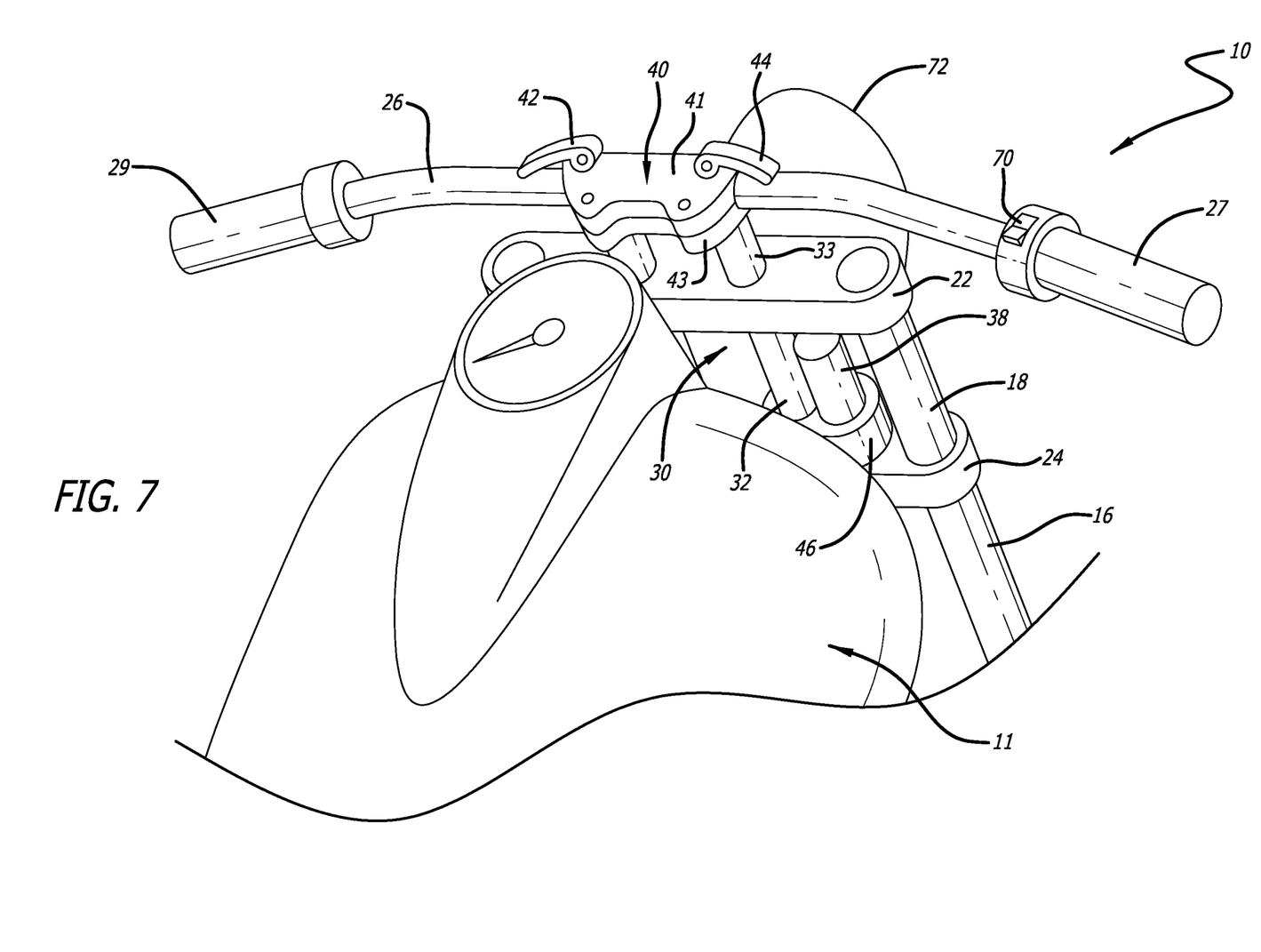
FIG. 7 is a partial right rear quarterly perspective view of the handlebar adjustment mechanism of the present invention as depicted in FIG. 1 in the first lowered position.

FIG. 7 is a partial right rear quarterly perspective view of the handlebar adjustment mechanism of the present invention as depicted in FIG. 1 in the first lowered position.

Figure 8:
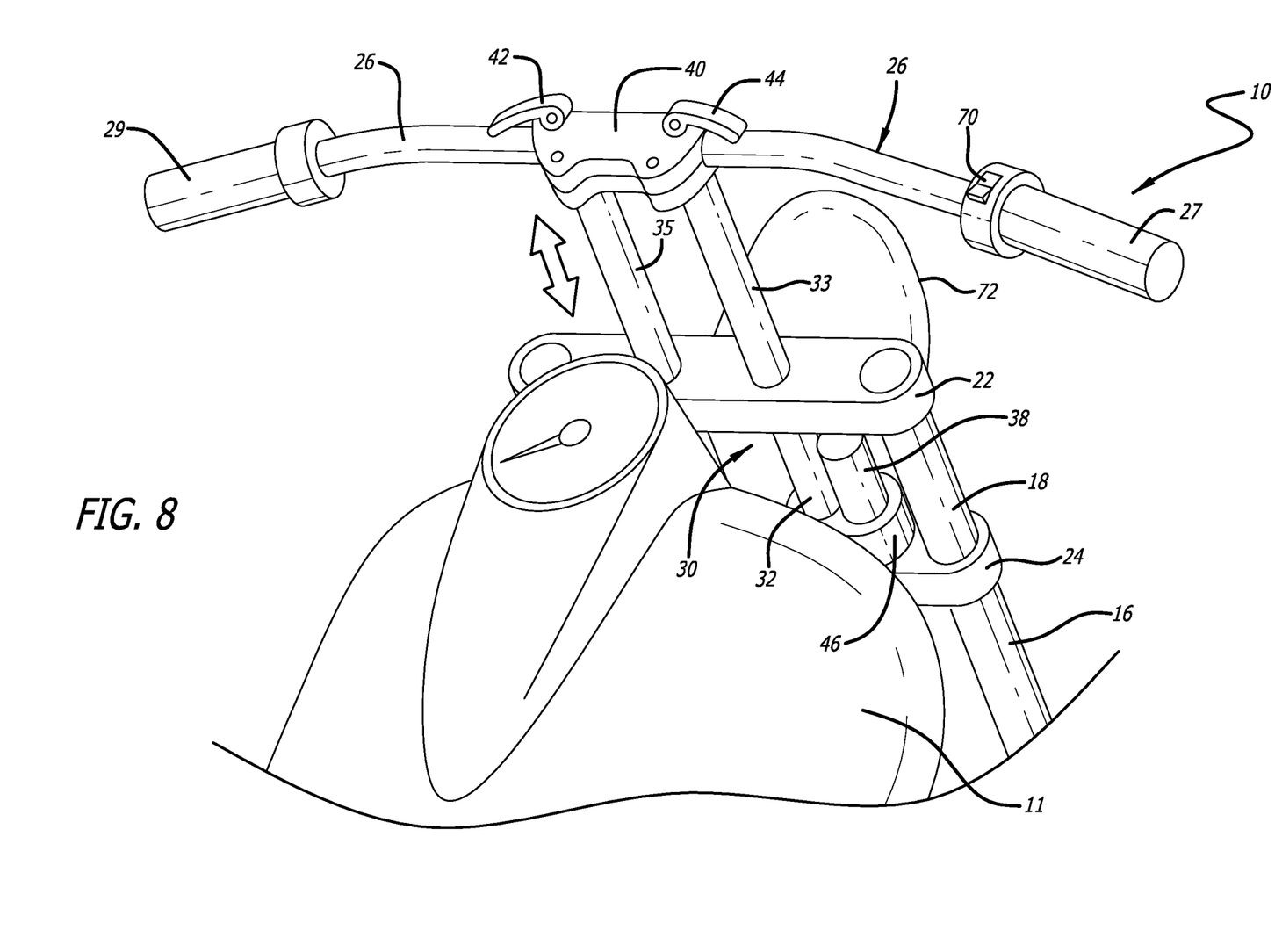
FIG. 8 is the partial right rear quarterly perspective view of the illustrative embodiment of the compact streamlined handlebar adjustment mechanism of the present invention mounted on a motorcycle depicted in FIG. 5 in the second elevated position.

FIG. 8 is the partial right rear quarterly perspective view of the illustrative embodiment of the compact streamlined handlebar adjustment mechanism of the present invention mounted on a motorcycle depicted in FIG. 5 in the second elevated position.

As shown in FIGS. 7 and 8, a rocker switch 70 mounted, on the right or left grip 27 or 29, actuates the motors 50 and 60. In the best mode, the switch 70 is a rocker switch with three positions for 'up', 'down' and 'neutral' to enable the bars to be elevated from the lower position shown in FIG. 7 to the upper position shown in FIG. 8. Other arrangements may be provided for activation of the motors without departing from the scope of the present teachings.

In FIGS. 7 and 8, a portion of the motorcycle frame or chassis 11 is shown along with a conventional speedometer. A headlight 72 is shown mounted on the triple tree 14 as is common in the art.

Figure 9:
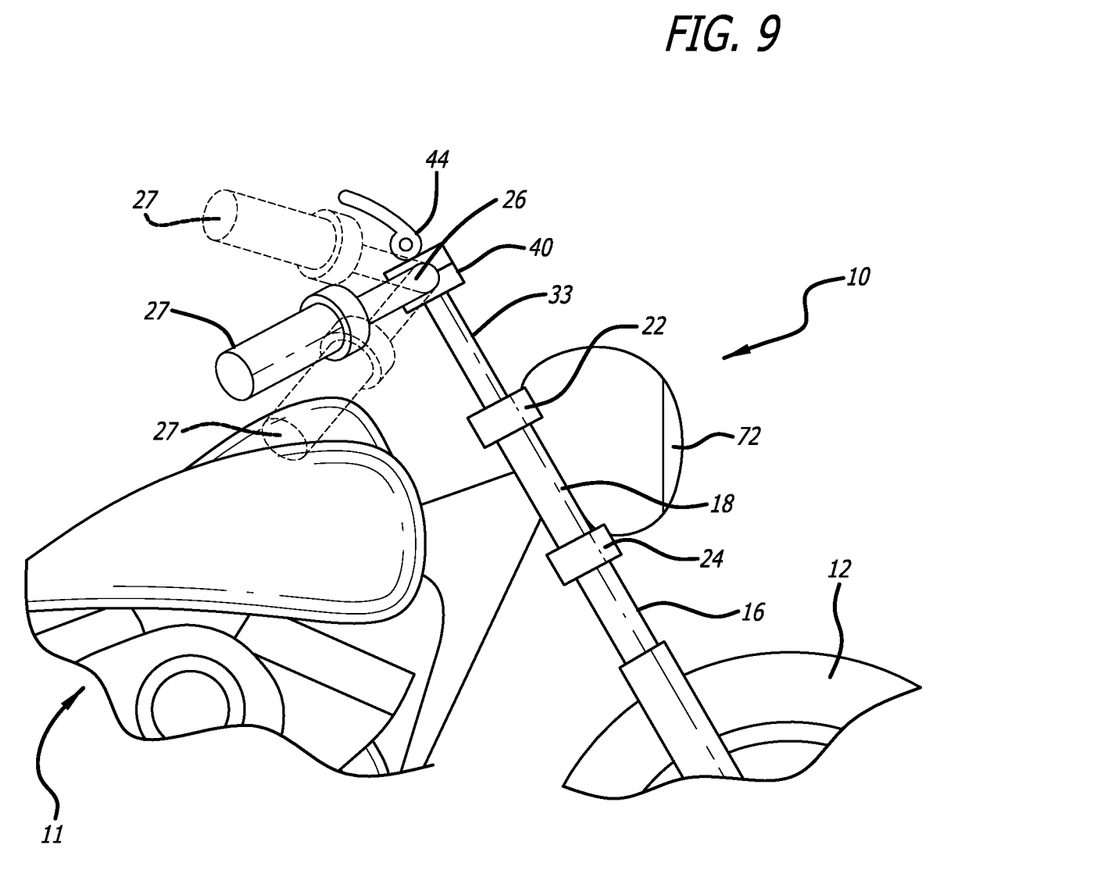
FIG. 9 is a side elevational view of the handlebar adjustment mechanism of the present invention as depicted in FIG. 8 in the second elevated position with alternate handlebar orientations shown in phantom.

FIG. 9 is a side elevational view of the handlebar adjustment mechanism of the present invention as depicted in FIG. 8 in the second elevated position with alternate handlebar grip orientations shown in phantom. The alternate grip locations are enabled by lifting the first and second quick release or pressure levers 42 and 44 and rotating the handlebar 26 about the longitudinal axis thereof at the clamp 40 to a desired orientation and subsequently closing the quick release levers 42 and 44.

In the best mode, the handlebar adjustment mechanism 30 of the present invention is implemented with stainless steel or other suitable metallic material. Although the invention is not limited to the material construction thereof.

Those of ordinary skill in the art will appreciate that the present invention is not limited to use on motorcycles. The invention may be used on other vehicles having handheld steering mechanisms such as snow mobiles, jet skis, bicycles etc.

Thus, the present invention has been described herein with reference to a particular embodiment for a particular application. Those having ordinary skill in the art and access to the present teachings will recognize additional modifications, applications and embodiments within the scope thereof. For example, the present invention is not limited to use on motorcycles. Those of ordinary skill in the art will appreciate that the present invention can be used on any vehicle having a steering control such as a snow mobile, bicycle or other wheeled or ski based vehicle. Further, the invention is not limited to use on vehicles with handlebars. That is, the present teachings may be used on a vehicle with a single stalk steering control. Those of ordinary skill in the art will also appreciate that the invention is not limited to the use of electric motors as actuators. Hydraulic, pneumatic and/or solenoid actuators may be used as well. The remote control could be voice activated and helmet mounted.

It is therefore intended by the appended claims to cover any and all such applications, modifications and embodiments within the scope of the present invention.

The invention claimed is:

1. A powered handlebar adjustment assembly for use with a vehicle having first and second forks aligned in a parallel relation to a first longitudinal axis, first and second triple tree supports aligned in parallel relation to a second axis transverse to the first longitudinal axis, and a set of handlebars mounted parallel to the first and second triple tree supports and transverse to the first and second forks, the powered handlebar adjustment assembly comprising:
   a first telescopic support having:
      a first section thereof mounted between and in parallel with the first and second forks and between and transverse to the first and second triple tree supports and
      a second section disposed between the first triple tree support and the set of handlebars and concentric with the first section, the second section being configured for translation relative to the first section between the first and second forks and parallel thereto and
   a first actuator mounted between the first and second forks and between the first and second triple tree supports, the first actuator operationally coupled to the second section of the first telescopic support,
   whereby actuation of the first actuator is effective to cause the second section of the first telescopic support to translate relative to the first section thereof and thereby move the set of handlebars from a first position to a second position.

2. The invention of claim 1 further including a second telescopic support having a third section thereof mounted between and in parallel with the first and second forks and between and transverse to the first and second triple tree supports and a fourth section disposed between the first triple tree support and the set of handlebars and concentric with the third section, the fourth section being configured for translation relative to the third section between the first and second forks and parallel thereto.

3. The invention of claim 2 further including a second actuator mounted between the first and second forks and between the first and second triple tree supports, the second actuator operationally coupled to the fourth section of the second telescopic support whereby actuation of the second actuator is effective to cause the fourth section of the second telescopic support to translate relative to the third section and thereby move the set of handlebars from the first position to the second position.

4. The invention of claim 3 further including a handlebar clamp for securing the first and second telescopic supports to the set of handlebars.

5. The invention of claim 4 further including first and second pressure levers for securing the handlebar clamp to the set if handlebars whereby the set of handlebars are adapted to rotate about a longitudinal axis through the handlebar clamp in a first open position of the first and second pressure levers and restrained against rotational motion about the longitudinal axis in a second closed position thereof.

6. The invention of claim 5 whereby the set of handlebars have first and second grips mounted at a distal end thereof respectively.

7. The invention of claim 6 wherein the first and second actuators include electrical motors.

8. The invention of claim 7 wherein the first and second actuators include worm drives.

9. The invention of claim 7 further including a switch for controlling the first and second actuators.

10. The invention of claim 9 wherein the switch is mounted at one of the first and second grips.

11. The invention of claim 6 wherein the first and second actuators are hydraulic.

12. The invention of claim 6 wherein the first and second actuators are pneumatic.

13. A powered handlebar adjustment assembly for use with a vehicle having first and second forks aligned in a parallel relation to a first longitudinal axis, first and second triple tree supports aligned in parallel relation to a second axis transverse to the first longitudinal axis, and a set of handlebars mounted parallel to the first and second triple tree supports and transverse to the first and second forks, the powered handlebar adjustment assembly comprising:
  a first telescopic support having:
    a first section thereof mounted between and in parallel with the first and second forks and between and transverse to the first and second triple tree supports and
    a second section disposed between the first triple tree support and the set of handlebars and concentric with the first section, the second section is configured for translation relative to the first section between the first and second forks and parallel thereto;
  a second telescopic support having:
    a third section thereof mounted between and in parallel with the first and second forks and between and transverse to the first and second triple tree supports and
    a fourth section mounted between the first triple tree support and the set of handlebars and concentric with the third section, the fourth section is configured for translation relative to the third between the first and second forks and parallel thereto;
  a first actuator mounted between the first and second forks and between the first and second triple tree supports, the first actuator operationally coupled to the second section of the first telescopic support; and
  a second actuator mounted between the first and second forks and between the first and second triple tree supports, the second actuator operationally coupled to the fourth section of the second telescopic support,
  whereby actuation of the first and second actuators is effective to cause the second and fourth sections of the first and second telescopic supports to translate relative to the first and third sections thereof and thereby move the set of handlebars from a first position to a second position.

14. The invention of claim 13 further including a handlebar clamp for securing the first and second telescopic supports to the set of handlebars.

15. The invention of claim 14 further including first and second pressure levers for securing the handlebar clamp to the set of handlebars whereby the set of handlebars are adapted to rotate about a longitudinal axis through the handlebar clamp in a first open position the first and second pressure levers and restrained against rotational motion about the longitudinal axis in a second closed position thereof.

16. The invention of claim 15 whereby the set of handlebars have first and second grips mounted at a distal end thereof respectively.

17. The invention of claim 16 wherein the first and second actuators include electrical motors.

18. The invention of claim 17 wherein the first and second actuators include worm drives.

19. The invention of claim 17 further including a switch for controlling the first and second actuators.

20. The invention of claim 19 wherein the switch is mounted at one of the first and second grips.

21. The invention of claim 13 wherein the first and second actuators are hydraulic.

22. The invention of claim 13 wherein the first and second actuators are pneumatic.

23. A method for providing for powered handlebar adjustment including the steps of:
  mounting a handlebar adjustment assembly on a vehicle having first and second forks aligned in a parallel relation to a first longitudinal axis, first and second triple tree supports aligned in parallel relation to a second axis transverse to the first longitudinal axis, and a set of handlebars mounted parallel to the first and second triple tree supports and transverse to the first and second forks, the powered handlebar adjustment assembly including:
    a first telescopic support having:
      a first section thereof mounted between and in parallel with the first and second forks and between and transverse to the first and second triple tree supports and
      a second section disposed between the first triple tree support and the set of handlebars and concentric with the first section, the second section is configured for translation relative to the first section between the first and second forks and parallel thereto;
    a second telescopic support having:
      a third section thereof mounted between and in parallel with the first and second forks and between and transverse to the first and second triple tree supports and
      a fourth section mounted between the first triple tree support and the set of handlebars and concentric with the third section, the fourth section being configured for translation relative to the third section between the first and second forks and parallel thereto;
    a first actuator mounted between the first and second forks and between the first and second triple tree supports, the first actuator operationally coupled to the second section of the first telescopic support;
    a second actuator mounted between the first and second forks and between the first and second triple tree supports, the second actuator operationally coupled to the fourth section of the second telescopic support whereby actuation of the second actuator is effective to cause the fourth section of the second telescopic support to translate relative to the third section and thereby move the set of handlebars from a first position to a second position, actuating the first and second actuators to cause the second and fourth sections of the first and second telescopic supports to translate relative to the first and third sections thereof and thereby move the set of handlebars from the first position to the second position.

24. The invention of claim 23 further including the steps of activating the first and second actuators via a switch mounted on the set of handlebars.

25. The invention of claim 23 further including the steps of providing a clamp to secure the set of the handlebars to the first and second telescopic supports.

26. The invention of claim 25 further including the steps of activating pressure levers to adjust the set of handlebars about a longitudinal axis thereof within the clamp.

\* \* \* \* \*